(12) United States Patent
Lee et al.

(10) Patent No.: US 6,927,249 B1
(45) Date of Patent: Aug. 9, 2005

(54) HEAT ABSORB-RELEASE PLASTIC RESIN COMPOSITION AND MOLDED PRODUCT THEREOF

(75) Inventors: Heon-Sang Lee, Daejeon (KR);
Ju-Hyung Lee, Daejeon (KR);
Kyung-Mo Park, Seoul (KR);
Duck-Kun Hwang, Seoul (KR);
Chong-Koo Kum, Daejeon (KR);
Eung-Soo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/775,147

(22) Filed: Feb. 11, 2004

(51) Int. Cl.$^7$ .............................................. C08K 5/01

(52) U.S. Cl. ...................... 524/490; 524/493; 524/489; 525/222; 525/224; 525/229

(58) Field of Search ................................ 524/490, 493, 524/489; 525/222, 224, 229

(56) References Cited

U.S. PATENT DOCUMENTS

| | | | |
|---|---|---|---|
| 4,797,160 A | 1/1989 | Salyer | |
| 5,053,446 A | 10/1991 | Salyer | |
| 5,565,132 A * | 10/1996 | Salyer | ........................ 252/70 |
| 2003/0068487 A1 * | 4/2003 | Nguyen et al. | ............. 428/323 |

* cited by examiner

*Primary Examiner*—William K. Cheung
(74) *Attorney, Agent, or Firm*—Birch, Stewart, Kolasch & Birch, LLP

(57) ABSTRACT

The present invention relates to a heat absorb-release plastic composition and a molded product thereof, more specifically to a heat absorb-release plastic resin composition, which can sense a temperature at a specific temperature, has flexural strength, and can absorb or release heat as a latent heat, and a molded product thereof.

The heat absorb-release plastic resin composition absorbs heat at a desired temperature as a latent heat and thus temperature increase is small, and therefore, it can be used for automobile interior decoration material, housing for an electric home appliances, etc. even if it has comparatively low Heat deflection temperature.

13 Claims, 2 Drawing Sheets

HEAT ABSORB-RELEASE PLASTIC RESIN COMPOSITION AND MOLDED PRODUCT THEREOF

BACKGROUND OF THE INVENTION (a) Field of the Invention

The present invention relates to a heat absorb-release plastic resin composition and a molded product thereof, more particularly to a heat absorb-relates plastic resin composition, which senses a temperature at a specific temperature, is an engineering plastic having flexural strength, or can absorb or release heat as latent heat, and a molded product thereof.

(b) Description of the Related Art

There is increased interest in plastics having heat absorb-release properties. Particularly, engineering plastics are widely used for automobile interior decorating and trimming material or housing for electric home appliances, etc. due to superior heat resistance and mechanical properties. Conventional engineering plastics are applied by blending two or more kinds of polymers or adding organic or inorganic material as a filler according to the costs and required physical properties. The engineering plastics used for automobile interior decorating and trimming material, housing for electric home appliances, etc. require very high Heat deflection temperature of 70 to 300° C. due to temperature increase by heat.

U.S. Pat. No. 4,797,160 and U.S. Pat. No. 5,053,446 disclose a composition showing heat absorb-release properties according to fusion or crystallization of phase transition material. However, these are limited only to polyolefin, and do not show balanced physical properties under applied environments.

The heat absorb-release plastics should have temperature sensing ability, heat absorb-release performance, and mechanical properties, so as to function as a temperature control system.

SUMMARY OF THE INVENTION

The present invention is made in consideration of the problems of the prior art, and it is an object of the present invention to provide a heat absorb-release plastic resin composition capable of absorbing and/or releasing heat at a specific temperature.

It is another object of the present invention to provide a heat absorb-release plastic resin composition capable of absorbing and releasing heat, and sensing a temperature at a specific temperature.

It is still another object of the present invention to provide a heat absorb-release engineering plastic resin composition, which has flexural strength and thus can maintain a specific form under applied environments of stress or temperature of phase transition, therefore can be used as a structural material.

It is still another object of the present invention to provide a molded product prepared from the heat absorb-release engineering plastic composition.

DETAILED DESCRIPTION OF THE PREFERRED EMBODIMENTS

Figure 1:
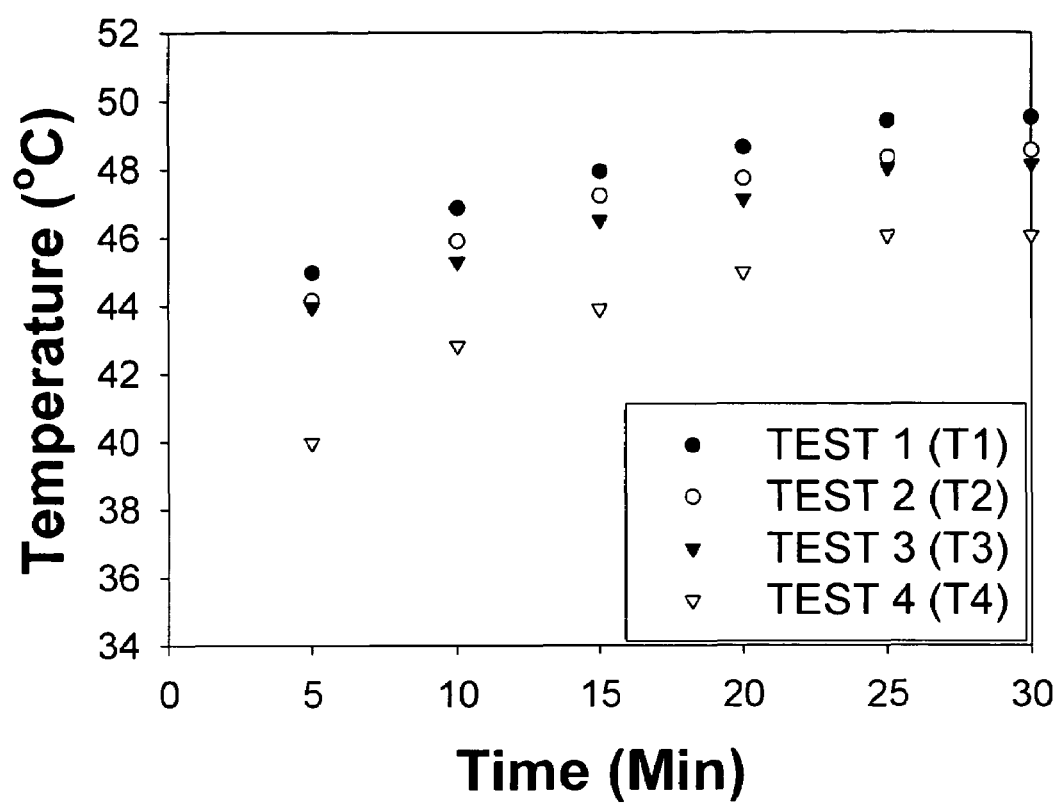
FIG. 1 is a graph showing temperature change of the molded product prepared from the resin composition of the present invention with the passage of time.

In order to achieve these objects, the present invention provides a heat absorb-release plastic resin composition comprising a matrix resin material and a phase transition material having lower fusion-crystallization temperature than the matrix resin material and having heat absorb amount or heat release amount of 10 J/g or more at a lower temperature than fusion temperature of the matrix resin material, said heat absorb-release plastic resin composition satisfying one of the following requirements:

a) Flexural Modulus of 3000 $Kg/cm^2$ or more,
   b) room temperature thermal conductivity of 0.4 W/m-K or more, and
   c) Flexural Modulus of 3000 $Kg/cm^2$ or more, and room temperature thermal conductivity of 0.4 W/m-K or more.

The present invention provides a heat absorb-release plastic resin composition, which satisfies thermal conductivity of 0.4 W/m-K or more, hence absorbs heat as latent heat at a desired temperature and thus temperature increase is small when heat is applied, and can release heat at a desired temperature when surrounding temperature decreases. The plastic resin composition of the present invention has room temperature thermal conductivity of 0.4 W/m-K or more, preferably 0.7 W/m-K or more, and more preferably 5 W/m-K or more. If the thermal conductivity of the composition is less than 0.4 W/m-K, the composition has little difference from the existing heat storage materials because of insufficient capability of sensing surrounding temperature change.

The present invention also provides an engineering plastic which satisfies Flexural Modulus of 3000 $Kg/cm^2$ or more, hence can maintain a specific form under applied conditions of stress or temperature according to phase transition and thus can be used as a structural material. The engineering plastic referred to in the present invention means plastics that can maintain specific forms under applied conditions (temperature, stress, etc.) and thus can be used as a structural material. Therefore, the heat absorb-release engineering plastic means plastics that can sense a specific temperature and thus can be used as a structural material capable of absorbing and releasing heat. The engineering plastic resin composition has Flexural Modulus of 3000 $Kg/cm^2$ or more, and preferably 10000 $Kg/cm^2$ or more, and the sufficiently high flexural strength allows use as engineering plastics.

The present invention also provides a heat absorb-release plastic resin composition which satisfies a) Flexural Modulus of 3000 $Kg/cm^2$ or more and b) room temperature thermal conductivity of 0.4 W/m-K or more, hence can sense a temperature at a specific temperature to absorb and release heat, has sufficient flexural strength and thus can maintain specific form under applied conditions of stress or temperature according to phase transition and can be used as a structural material. The heat absorb-release plastic of the present invention has small temperature increase due to heat absorption at a specific temperature, and thus can be used under heat-applied environment, even if it has lower Heat deflection temperature compared to conventional engineering plastics. And, such heat absorb-release plastic can be used for maintaining a specific temperature. For example, an automobile interior decoration material is likely to become hot due to solar heat in the summer. If the heat absorb-release plastic is applied for an automobile interior decoration material, it absorbs heat to provide refreshing environment to a user, and it can release heat when temperature decreases at night. And, it can also used for housing or fittings for electric home appliances, cooling or heating appliances, fiber, building material, flooring material, etc.

The matrix resin material used in the present invention includes thermoplastic or thermosetting resin, and is not specifically limited. For examples, it is selected from the group consisting of polybutylene terephthalate, polyethylene terephthalate, aromatic polyamide, polyamide, polycarbonate, polystyrene, polyphenylene sulfide, thermal emitting liquid crystal polymer, polysulfone, polyether sulfone, polyether imide, polyether ether ketone, polyarylate, polymethyl methacrylate, polyvinylalcohol, polypropylene, polyethylene, polyacrylonitile butadiene styrene copolymer, polytetramethylene oxide-1,4-butandiol copolymer (polybutylene terephthalate elastic body), styrene containing copolymer (SBR, SBS, ASA, etc.), fluorine-type resin (PVDF, PTFE, FEP, etc.), polyvinylchloride, polyacrylonitrile, and a mixture thereof.

The phase transition material used in the present invention absorbs or releases heat as latent heat in an amount of 10 J/g or more, preferably 30 J/g or more at lower temperature than fusion temperature of the matrix resin material. The phase transition material absorbs or releases heat as latent heat in an amount of 10 J/g or more at a lower fusion-crystallization temperature than fusion temperature of the matrix resin material. For examples, it is selected from the group consisting of zeolite powder, polytriphenylphosphate, crystalline paraffin wax, polyethyleneglycol, fatty acid, naphthalene, calcium bichloride, polyepsilon caprolactone, polyethylene oxide, polyisobutylene, polycyclopentene, polycyclooctene, polycyclododecene, polyisoprene, polyoxytriethylene, polyoxytetramethylene, polyoxyoctamethylene, polyoxypropylene, polybutyrolactone, polyvalerolactone, polyethyleneadipate, polyethylene suberate, polydecamethylazelate, and a mixture thereof. Even if these organic and inorganic materials are selected, if fusion-crystallization temperature is higher than fusion temperature of the matrix resin, they cannot absorb and release heat at applied temperature.

The matrix resin is preferably contained in the composition in an amount of 10 to 95 parts by weight. In terms of functions as a matrix, 10 parts by weight of more is preferable, and in terms of effective heat absorb-release, 95 parts by weight or less is preferable. The phase transition material is preferably contained in the composition in an amount of 5 to 90 parts by weight. If the content of the phase transition material is less than 5 parts by weight, it is inefficient due to small heat absorb-release amount, and if the content is more than 90 parts by weight, it cannot maintain its form at applied temperature.

The composition of the present invention may further comprise one or more kinds of compatibilizers. The compatibilizer is preferably selected from the group consisting of polyolefin copolymerized with maleic anhydride or vinyl acetate, styrene-ethylene-butadiene-styrene copolymer, styrene-butadiene-styrene copolymer, polyolefin copolymerized with amide group, and a mixture thereof. The compatibilizer is preferably contained in the composition in an amount of 0.1 to 30 parts by weight of the a) resin and the b) inorganic material or organic material. If the content is less than 0.1 parts by weight, it cannot functions as a compatibilizer, and if the content exceeds 30 parts by weight, heat absorb-release is not effective.

And, the composition of the present invention may further comprise one or more kinds of thermally conductive additives. The thermally conductive additive can be a ceramic or metal having thermal conductivity of 5 W/m-K or more. For examples, the thermally conductive additive is selected from the group consisting of copper, silver, gold, steel, nickel, silicon carbide, boron nitride, diamond, beryllium oxide, boron phosphide, aluminum nitride, beryllium sulfide, boron azenide, silicon, gallium nitride, aluminum phosphide, gallium phosphide, and a mixture thereof. The thermally conductive additive is preferably contained in the composition in an amount of 5 to 90 parts by weight, based on 100 parts by weight of the total amount of the matrix resin and the phase transition material. If the content is less than 5 parts by weight, thermal conductivity increasing effect is insufficient, and if the content is more than 90 parts by weight, heat absorb-release is insufficient.

And, the composition of the present invention may further comprise a reinforcing additive. The reinforcing additive is preferably selected from the group consisting of glass fiber, carbon fiber, talc, glass flake, mica, carbon black, carbon nanotube, and a mixture thereof. The reinforcing additive is preferably contained in the composition in an amount of 1 to 30 parts by weight, based on 100 parts by weight of the total amount of the a) resin and the b) inorganic or organic material. If the content is less than 1 part by weight, mechanical strength reinforcing effect is not shown, and if the content exceeds 30 parts by weight, heat absorb-release amount decreases and processing is difficult.

The plastic resin composition of the present invention preferably has thermal conductivity satisfying the following Equation, when contacts with a fluid medium, and more preferably the following Equation 2:

$$\left(\frac{hd}{k}\right) < 1 \qquad \text{[Equation 1]}$$

$$\left(\frac{hd}{k}\right) < 0.1 \qquad \text{[Equation 2]}$$

wherein, h is heat transfer coefficient (W/m2K) of the composition, d is a thickness (m) of the composition, and k is thermal conductivity (W/m-K) of the composition.

In addition, the plastic resin composition of the present invention preferably has thermal conductivity satisfying the following Equation 3, when contacts with a solid phase medium:

$$\frac{d}{k} < \frac{d_a}{k_a} \qquad \text{[Equation 3]}$$

wherein, d is a thickness (m) of the composition, k is thermal conductivity (W/m-K) of the composition, and $d_a$ and $k_a$ respectively are thickness and thermal conductivity of the material contacting with the composition.

The Equation will be explained in detail.

Thermal capacity, which is energy required for temperature of material of 1 g to change by 1° K. at constant pressure, is defined as the following Equation:

$$Cp = \left(\frac{\partial H}{\partial T}\right)p \quad \text{[Equation 4]}$$

wherein, Cp is heat capacity at a constant pressure (P), and H is an enthalpy, and T is a temperature.

Heat gained or lost by material according to change of temperature is as the following Equation 5, and such change in temperature according to sensible heat capacity. The following Equation 5 represents heat capacity (1) obtained by material comprising n ingredients, when temperature increases. Conventional engineering plastic has relationship between energy and temperature as shown in the following Equation 5.

$$Q_1 = \int_{T_1}^{T_2} \sum_{j=m+1}^{n} \left(\frac{w_j}{\sum_{i=m+1}^{n} w_i}\right) C_{pj}^s dT \quad \text{[Equation 5]}$$

wherein, w is a weight of an ingredient.

However, the heat absorb-release plastic of the present invention comprises an ingredient that absorbs or releases heat as latent heat at a specific temperature, as shown in the second item of the following Equation 6.

$$Q_2 = \int_{T_1}^{T_{01}} \sum_{i=1}^{n} w_i C_{pi}^s dT + \quad \text{[Equation 6]}$$

$$\sum_{i=1}^{m} w_i \Delta H_{mi} + \int_{T_{01}}^{T_2} \left[\sum_{i=m+1}^{n} w_i C_{pi}^s + \sum_{i=1}^{m} w_i C_{pi}^l\right] dT$$

wherein, w is a weight ratio of an ingredient.

The heat absorb-release plastic has smaller temperature increase than conventional plastic, under the same sensible heat capacity applied.

The second item of the Equation 6 can use exothermic or endothermic energy generated during absorption or desorption. Alternatively, the second item can use exothermic or endothermic energy generated when a dispersed phase fuses or crystallizes. Since the absorption-desorption or fusion-crystallization occurs at a specific temperature according to the kinds of dispersed phase, plastic material containing such dispersed phase absorbs or release heat at a specific temperature.

Meanwhile, in order for a material to sense a temperature, the material should have sufficient sensitivity. Specifically, sufficient heat transfer should be conducted inside of the material, compared to speed of conduction, convention, radiation, etc. Specifically, thermal resistance (d/k: d is a thickness of a molded product from a material) due to thermal conductivity (k: [W/m-K]) should be smaller than thermal resistance (1/h) due to heat transfer coefficient (h:[W/m²K]). If thermal conductivity of a material is low and the material cannot sense surrounding temperature, heat absorb-release is not effective. Thus, a material should have thermal conductivity satisfying the above Equations 1 to 3.

The present invention also provides a molded product prepared from the plastic composition. The above plastic composition can be applied for the molded product of the present invention. And, as a method for preparing a molded product, conventional plastic molded product preparation method can be used, and for example, injection molding can be used.

As will be appreciated by one of skill in the art, there are many other uses for the rice lines of the current invention. Several examples are listed below.

EXAMPLES

Example 1

Injection molded samples were prepared from the resin compositions with compositions and compositional ratios as shown in the following Table 1 using a twin-screw extruder.

TABLE 1

(unit: wt %)

| | Example 1 | Example 2 |
|---|---|---|
| Matrix | Polypropylene 35 | Polybutyleneterephthalate 35 |
| Phase change material | Paraffin wax 15 | Stearic acid 15 |
| Compatibilizer | Ethylene vinylacetate 12 | Maleic anhydride-ethylene copolymer 10 |
| Thermally conductive additive | Silicon carbide 38 | Silicon carbide 40 |
| Reinforcing additive | — | — |
| Heat-absorb/release amount | 16 J/g at about 55° C. | 14 J/g at about 30° C. |
| Heat deflection temperature | 80° C. | 85° C. |
| Impact strength | 3 kg · cm/cm | 3 kg · cm/cm |
| Flexural Modulus | 17000 kg/cm2 | 23000 kg/cm2 |
| Thermal conductivity (room temperature) | 0.6 W/m-K | 1.0 W/m-K |

Physical properties of the injection molded samples were measured as follows:
- Heat deflection temperature: ASTM D638
- Impact strength: ASTM D256
- Flexural Modulus: ASTM D790
- Heat-absorb/release amount: Differential Scanning Calorimeter
- Thermal conductivity: Guarded hot-plate method (LG Chemical Tech. center), $d_a$ ta with error within 10% when measured according to Haake Thermoflixer measurement method or ASTM C177.

For the injection molded sample prepared in Example 1, heat absorb-release amount was 16 J/g around 55° C. according to fusion or crystallization of paraffin wax, heat deflection temperature was 80° C., impact strength was 3 kg.cm/cm, Flexural Modulus was 17000 kg/cm², and room temperature thermal conductivity was 0.6 W/m-K. Since the product prepared in Example 1 has Flexural Modulus of 17000 kg/cm², it can be used as structural material like common engineering plastic, while it can sense a temperature and absorb and release heat due to high heat-absorb/release amount and thermal conductivity.

Example 2

Injection molded samples were prepared by the same method as in Example 1, except using a resin composition with compositions and compositional ratio as shown in Table 1. Heat deflection temperature, impact strength, Flexural Modulus, heat-absorb/release amount and thermal conductivity of the sample were measured by the same method as in Example 1.

For the injection molded sample prepared in Example 2, heat absorb-release amount was 14 J/g around 40° C. according to fusion or crystallization of paraffin wax, Heat deflection temperature was 85° C., impact strength was 3 kg.cm/cm, Flexural Modulus was 23000 kg/cm², and room temperature thermal conductivity was 1.0 W/m-K. Since the product prepared in Example 2 has Flexural Modulus of 23000 kg/cm², it can be used as structural material like common engineering plastics, while it can sense a temperature and absorb and release heat due to high heat absorb-release amount and thermal conductivity.

Example 3

An injection molded sample was prepared by the same method as in Example 1, except that a resin composition comprising 60 wt % of polypropylene and 40 wt % of polyepsilon caprolactone as shown in the following Table 2 was used. Heat deflection temperature, impact strength, Flexural Modulus, heat absorb-release amount, and thermal conductivity of the sample were measured by the same method as in Example 1.

Heat absorb-release amount of the injection molded sample was 31 J/g around 48° C. according to fusion or crystallization of polyepsilon caprolactone. Heat deflection temperature was 74° C., impact strength was 10 kg.cm/cm, Flexural Modulus was 4048 kg/cm2, and room temperature thermal conductivity was 0.17 W/m-K. Since the product prepared in Example 3 has 4048 kg/cm², it can be used as structural material like common engineering plastics, while it can absorb and release heat.

TABLE 2

(unit: wt %)

|  | Example 3 | Example 4 |
| --- | --- | --- |
| Matrix | Polypropylene (60) | Polystyrene-acrylonitrile copolymer (74.7) |
| Phase change material | Polyepsilon caprolactone (40) | Paraffin wax (18.7) |
| Compatibilizer | — | Polystyrene ethylene butadiene styrene copolymer (4.6) |
| Thermally conductive additive | — | — |
| Reinforcing additive | — | Carbon black 2 |
| Heat absorb-release amount | 48° C., 31 J/g | 55° C., 20 J/g |
| Heat deflection temperature | 74° C. | 65° C. |
| Impact strength | 10 kg · cm/cm | 4 kg · cm/cm |
| Flexural Modulus | 4048 kg/cm2 | 5000 kg/cm2 |
| Thermal conductivity (room temperature) | 0.17 W/m-K | 0.19 W/m-K |

Example 4

An injection molded sample was prepared by the same method as in Example 1, except that a resin composition comprising 74.7 wt % of polystyrene-acrylonitrile copolymer, 18.7 wt % of paraffin wax, 2 wt % of carbon black and 4.6 wt % of polystyrene ethylene butadiene styrene copolymer as shown in Table 2 was used. Heat deflection temperature, impact strength, Flexural Modulus, heat absorb-release amount, and thermal conductivity of the sample were measured by the same method as in Example 1.

The paraffin wax absorbs or releases heat at phase transition temperature of 40° C., and the carbon black well mixes with the paraffin wax and increases viscosity of the paraffin to maintain the shape of dispersed phase. The polystyrene ethylene butadiene styrene copolymer prevents paraffin wax fusion liquid from flowing at an interface of paraffin wax and polystyrene-acrylonitrile copolymer. The heat absorb-release amount of the injection molded sample was 20 J/g around 55° C. according to fusion or crystallization of paraffin wax. Heat deflection temperature was 65° C., impact strength was 4 kg.cm/cm, Flexural Modulus was 5000 kg/cm2, room temperature thermal conductivity was 0.19 W/m-K. Since the product prepared in Example 4 has Flexural Modulus of 5000 kg/cm2, it can be used as structural material like common engineering plastics, while it can absorb and release heat.

Example 5

An injection molded sample was prepared by the same method as in Example 1, except that a resin composition comprising 56 wt % of polypropylene, 15 wt % of ethylene vinylacetate, 25 wt % of paraffin wax, and 4 wt % of talc as shown in the following Table 3 was used. Heat deflection temperature, impact strength, Flexural Modulus, heat absorb-release amount and thermal conductivity of the sample were measured by the same method as in Example 1.

Heat absorb-release amount of the injection molded sample was 40 J/g around 55° C. according to fusion or crystallization of paraffin wax. Heat deflection temperature was 60° C., impact strength was 3 kg.cm/cm, Flexural Modulus was 320 kg/cm2, and room temperature thermal conductivity was 0.17 W/m-K. Since the product prepared in Example 5 has Flexural Modulus of 3200 kg.cm2, it can be used as structural material like common engineering plastics, while it can absorb and release heat.

TABLE 3

(unit: wt %)

|  | Example 5 | Example 6 | Example 7 |
| --- | --- | --- | --- |
| matrix | Polypropylene 56 | Polypropylene 55 | Polypropylene 56 |
| Phase transition material | Paraffin wax 25 | Paraffin wax 18 | Polyethylene glycol 25 |
| compatibilizer | Ethylene vinylacetate 15 | Ethylene vinylacetate 13.5 | Ethylene vinylacetate 15 |
| Thermally conductive additive | — | — | — |
| Reinforcing additive | Talc 4 | Talc 3.5 Glass fiber 10 | Talc 4 |
| Heat absorb-release amount | 55° C., 40 J/g | 55° C., 20 J/g | 50° C., 35 J/g |
| Heat deflection temperature | 60° C. | 90° C. | 55° C. |
| Impact strength | 3 kg · cm/cm | 7 kg · cm/cm | 3 kg · cm/cm |
| Flexural Modulus | 3200 kg/cm2 | 16512 kg/cm2 | 3000 kg/cm2 |
| Thermal conductivity (room temperature) | 0.17 W/m-K | 0.2 W/m-K | 0.18 W/m-K |

Example 6

An injection molded product was prepared by the same method as in Example 1, except that a resin composition comprising 55 wt % of polypropylene, 13.5 wt % of ethylene vinylacetate, 18 wt5 of paraffin wax, 3.5 wt % of talc, and 10 wt % of glass fiber as shown in Table 3 was used. Heat deflection temperature, impact strength, Flexural Modulus, heat absorb-release amount, and thermal conductivity of the sample were measured by the same method as in Example 1.

Heat absorb-release amount of the sample was 20 J/g around 55° C. according to fusion or crystallization of paraffin wax. Heat deflection temperature was 90° C., impact strength was 7 kg.cm/cm, Flexural Modulus was 16512 kg/cm2, and room temperature thermal conductivity was 0.2 W/m-K. Since the product prepared in Example 6 has Flexural Modulus of 3200 kg/cm2, it can be used as structural material like common engineering plastics, while it can absorb and release heat.

Example 7

An injection molded sample was prepared by the same method as in Example 1, except that a resin composition comprising 60 wt % of polybutylene terephthalate and 40 wt % of silicon carbide was used. Heat deflection temperature, impact strength, Flexural Modulus, heat absorb-release amount, and thermal conductivity were measured by the same method as in Example 1.

Heat absorb-release amount of the sample was 35 J/g around 50° C. according to fusion or crystallization of polyethyleneglycol. Heat deflection temperature was 55° C., impact strength was 3 kg.cm/cm, Flexural Modulus was 3000 kg/cm2, and room temperature thermal conductivity was 0.18 W/m-K. Since the product prepared in Example 7 has Flexural Modulus of 3000 kg/cm2, it can be used as structural material like common engineering plastics, while it can absorb and release heat.

Comparative Example 1

An injection molded sample was prepared by the same method as in Example 1, except that a resin composition comprising 60 wt % of polyutylene terephthalate and 40 wt % of silicon carbide was used. Heat deflection temperature, impact strength, Flexural Modulus, heat absorb-release amount, and thermal conductivity were measured by the same method as in Example 1.

Heat absorb-release amount of the sample was 0 J/g around 50° C. according to fusion or crystallization of polyethyleneglycol. Heat deflection temperature was 123° C., impact strength was 4 kg.cm/cm, Flexural Modulus was 30000 kg/cm2, and room temperature thermal conductivity was 1.1 W/m-K.

Example 8

Performance Test of Molded Product

A box with a length of 4 cm, width of 4 cm and distance between the upper and lower plates of 3 mm was prepared using a polycarbonate plate with a thickness of 1 mm. Inside of the box, on the lower plate, a glass plate with the same size and thickness of 1 mm was contacted, and a heat source with a length of 5 mm, width of 5 mm and thickness of 1 mm was installed in the center of the glass plate. Temperature of the upper plate center of the outside of the box was measured while continuously supplying power to the heat source.

Without samples in the box, temperature was measured with the passage of time, which was set as T1. And, in the box, the samples of Example 1, Example 3 (thermal conductivity of 0.17 W/m-K, heat absorb-release amount due to latent heat of 30 J/g), and Comparative Example 1 (heat absorb-release amount 0 J/g, thermal conductivity of 1.0 W/m-K) were put and temperature changes with the passage of time were measured, which were respectively set to T2, T3, and T4. Temperature changes with the passage of time were shown in FIG. 1.

As shown in FIG. 1, for the sample of Example 1, temperature increase decreases by 5° C. compared to T1, which is temperature change without a sample, and for the samples of Example 3 and Comparative Example 1, temperature increases decreases only by 1–2° C., which clearly shows the effects of the present invention. Specifically, for a material capable of sensing temperature increase due to sufficiently high thermal conductivity, and absorbing heat in the form of latent heat, temperature increase decreases. And, in case heat absorb-release amount of phase transition material is 0 J/g, and only thermal conductivity is high (Comparative Example 1), or in case only heat absorb-release amount by latent heat is high (Example 3), effects are not sufficient. The sample of Example 3 can be used as engineering plastic because it satisfies Flexural Modulus of 3000 kg/cm2, however, its thermal conductivity for sensing temperature to absorb and release heat is insufficient hence more preferable result is obtained in the sample of Example 1 satisfying thermal conductivity of 0.6 W/m-K or more.

Figure 2:
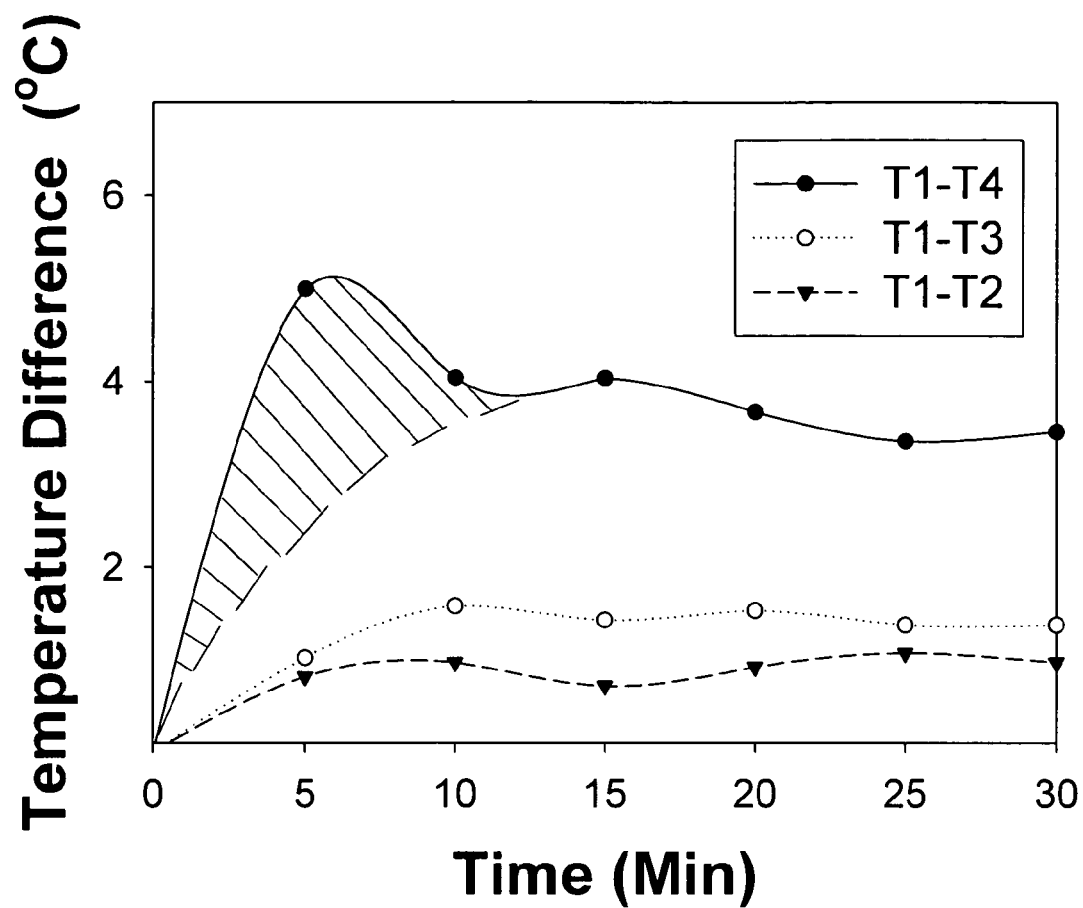
FIG. 2 is a graph showing difference in temperature changes of the molded products of Example and Comparative Example with the passage of time.

As shown in FIG. 2, for the sample of Example 1, a peak wherein heat is absorbed as latent heat occurs (comb-line part), but for the sample of Comparative Example 1 having high thermal conductivity only and the sample of Example 3 having high heat absorb-release amount only, such peaks are not shown. This is because that the material of Example 3 cannot sense temperature (thermal conductivity), and the material of Comparative Example 1 cannot absorb and release heat.

The heat absorb-release plastic according to the present invention can maintain a specific shape under applied conditions (temperature, stress), and thus can be used as a structural material. And, it can be applied for a specific usage requiring properties of little temperature increase when heat is applied and releasing heat when it gets cold, because it can sense a specific temperature to absorb or release heat.

What is claimed is:
1. A heat absorb-release plastic resin composition comprising
i) a matrix resin material selected from the group consisting of polybutylene terephthalate, polyethylene terephthalate, aromatic polyamide, polyamide, polycarbonate, polystyrene, polyphenylene sulfide, thermal emitting liquid crystal polymer, polysulfone, polyether sulfone, polyether imide, polyether ether ketone, polyacrylate, polymethyl methacrylate, polyvinylalcohol, polypropylene, polyethylene, polyacrylonitrile-butadiene-styrene copolymer, polytetramethyleneoxide-1,4-butandiol copolymer (polybutylene terephthalate elastic body), a styrene containing copolymer, fluorine-based resin, polyvinylchloride, polyacrylonitrile, and a mixture thereof,
ii) a phase transition material that has lower fusion-crystallization temperature than the matrix resin and has 10 J/g or more of heat absorb or heat release amount at a lower temperature than a fusion temperature of the matrix resin,
iii) a compatibilizer selected from the group consisting of maleic anhydride olefin copolymer, vinylacetate olefin copolymer, polyolefin copolymerized with amide group, styrene-ethylene-butadiene-styrene copolymer, styrene-butadiene-styrene copolymer, and a mixture thereof, and iv) a thermally conductive solid additive selected from the group consisting of copper, silver, gold, steel, nickel, silicon carbide, silicon, boron nitride, boron azenide, boron phosphide, diamond, beryllium oxide, beryllium sulfide, aluminum nitride, aluminum phosphide, gallium nitride, gallium phosphide, and a mixture thereof in an amount of 5 to 90 parts by weight, based on 100 parts by weight of the sum of said matrix resin material and said phase transition material, wherein, the ratio by weight of said matrix resin material and phase transition material ranges from 60:40 to 80:20, and said heat absorb-release plastic resin composition satisfies the requirements of Flexural Modulus being 3000 kg/cm$^2$ or more, and room temperature heat conductivity being 0.4 W/m-K or more.

2. The heat absorb-release plastic resin composition according to claim 1, wherein the resin composition has thermal conductivity satisfying the following Equation 1, when contacts with a liquid phase medium:

$$\left(\frac{hd}{k}\right) < 1 \quad \text{[Equation 1]}$$

wherein, h is heat transfer coefficient (W/m$^2$K) of the composition, d is a thickness of the composition, and k is thermal conductivity (W/m-K) of the composition.

3. The heat absorb-release plastic resin composition according to claim 2, wherein the resin composition has heat conductivity satisfying the following Equation 2, when contacts with a liquid phase medium:

$$\left(\frac{hd}{k}\right) < 0.1 \quad \text{[Equation 2]}$$

wherein, h is heat transfer coefficient (W/m$^2$K) of the composition, d is a thickness of the composition, and k is thermal conductivity (W/m-K) of the composition.

4. The heat absorb-release plastic resin composition according to claim 1, wherein the resin composition has heat conductivity satisfying the following Equation 3, when contacts with a solid phase medium:

$$\frac{d}{k} < \frac{d_a}{k_a} \quad \text{[Equation 3]}$$

wherein, d is a thickness (m) of the composition, k is thermal conductivity (W/m-K) of the composition, and $d_a$ and $k_a$ respectively are thickness and thermal conductivity of material contacted with the composition.

5. The heat absorb-release plastic resin composition according to claim 1, wherein the phase transition material is selected from the group consisting of zeolite powder, calcium bichloride, crystalline paraffin wax, polytriphenyl phosphate, polyethyleneglycol, fatty acid, naphthalene, polyepsilon caprolactone, polyethylene oxide, polyisobutylene, polycyclopentene, polycyclooctene, polyisoprene, polyoxytriethylene, polyoxyoctamethylene, polyoxypropylene, polybutyrolactone, polyvalerolactone, polyethyleneadipate, polyethylene suberate, polydecamethylazelate, and a mixture thereof.

6. The heat absorb-release plastic resin composition according to claim 1, further comprising a reinforcing additive selected from the group consisting of glass fiber, carbon fiber, talc, glass flake, mica, carbon black, carbon nanotube, and a mixture thereof, in an amount of 1 to 30 parts by weight, based on 100 parts by weight of the sum of the a) matrix material and the b) phase transition material.

7. A molded product prepared from the heat absorb-release plastic resin composition of claim 1.

8. The molded product according to claim 7, wherein the resin composition has thermal conductivity satisfying the following Equation 1, when contacts with a liquid phase medium:

$$\left(\frac{hd}{k}\right) < 1 \quad \text{[Equation 1]}$$

wherein, h is heat transfer coefficient (W/m$^2$K) of the composition, d is a thickness (m) of the composition, and k is thermal conductivity (W/m-K) of the composition.

9. The molded product according to claim 7, wherein the resin composition has thermal conductivity satisfying the following Equation 3, when contacts with a solid phase medium:

$$\frac{d}{k} < \frac{d_a}{k_a} \quad \text{[Equation 3]}$$

wherein, d is a thickness (m) of the composition, k is thermal conductivity (W/m-K) of the composition, and $d_a$ and $k_a$ respectively are thickness and thermal conductivity of material contacted with the composition.

10. The molded product according to claim 7, wherein the phase change material is selected from the group consisting of zeolite powder, calcium bichloride, crystalline paraffin wax, polytriphenylphosphate, polyethyleneglycol, fatty acid, naphthalene, polyepsiloncaprolactone, polyethyleneoxide, polyisobutylene, polycyclopentene, polycyclooctene, polycyclododecene, polyisoprene, polyoxytriethylene, polyoxytetramethylene, polyoxyoctamethylene, polyoxypropylene, polybutyrolactone, polyvalerolactone, polyethyleneadipate, polyethylene suberate, polydecamethyl azelate, and a mixture thereof.

11. The molded product according to claim 7, further comprising a reinforcing additive selected from the group consisting of glass fiber, carbon fiber, talc, glass flake, mica, carbon black, carbon nanotube, and a mixture thereof, in an amount of 1 to 30 parts by weight, based on 100 parts by weight of the sum of the a) matrix resin material and the b) phase change material.

12. A heat absorb-release plastic resin composition comprising:

i) a matrix resin material selected from the group consisting of polybutylene terephthalate, polyethylene terephthalate, aromatic polyamide, polyamide, polycarbonate, polystyrene, polyphenylene sulfide, thermal emitting liquid crystal polymer, polysulfone, polyether sulfone, polyether imide, polyether ether ketone, polyarylate, polymethyl methacrylate, polyvinylalcohol, polyacrylonitrile-butadiene-styrene copolymer, polytetramethyleneoxide-1,4-butandiol copolymer (polybutylene terephthalate elastic body), a styrene containing copolymer, fluorine-based resin, polyvinylchloride, polyacrylonitrile, and a mixture thereof, and ii) a phase transition material that has lower fusion-crystallization temperature than the matrix resin and has 10 J/g or more of heat absorb or heat release amount at a lower temperature than a fusion temperature of the matrix resin, wherein, the ratio by weight of said matrix resin material and phase transition material ranges from 60:40 to 80:20, and said heat absorb-release plastic resin composition satisfies one of the following requirements:

a) Flexural Modulus being 3000 Kg/cm$^2$ or more,
b) room temperature heat conductivity being 0.4 W/m-K or more, and
c) Flexural Modulus being 3000 Kg/cm$^2$ or more, and room temperature heat conductivity being 0.4 W/m-K or more.

13. A heat absorb-release plastic resin composition comprising:

i) a matrix resin material selected from the group consisting of polybutylene terephthalate, polyethylene terephthalate, aromatic polyamide, polyamide, polycarbonate, polystyrene, polyphenylene sulfide, thermal emitting liquid crystal polymer, polysulfone, polyether sulfone, polyether imide, polyether ether ketone, polyarylate, polymethyl methacrylate, polyvinylalcohol, polypropylene, polyethylene, polyacrylonitrile-butadiene-styrene copolymer, polytetramethyleneoxide-1,4-butandiol copolymer (polybutylene terephthalate elastic body), a styrene containing copolymer, fluorine-based resin, polyvinylchloride, polyacrylonitrile, and a mixture thereof, ii) a phase transition material that has lower fusion-crystallization temperature than the matrix resin and has 10 J/g or more of heat absorb or heat release amount at a lower temperature than a fusion temperature of the matrix resin, iii) a compatibilizer selected from the group consisting of maleic anhydride olefin copolymer, vinylacetate olefin copolymer, polyolefin copolymerized with amide group, styrene-ethylene-butadiene-styrene copolymer, styrene-butadiene-styrene copolymer, and a mixture thereof, and iv) a reinforcing additive selected from the group consisting of glass fiber, carbon fiber, talc, glass flake, mica, carbon black, carbon nanotube, and a mixture thereof, in an amount of 1 to 30 parts by weight, based on 100 parts by weight of the sum of said i) matrix material and said ii) phase transition material, wherein, the ratio by weight of said matrix resin material and phase transition material ranges from 60:40 to 80:20, and said heat absorb-release plastic resin composition satisfies the requirements of Flexural Modulus being 3000 Kg/cm$^2$ or more.

* * * * *